3,183,234
OCTAHYDROINDOLOQUINOLINES
William L. Garbrecht and Tsung-Min Lin, Indianapolis, Ind., assignors to Eli Lilly and Company, Indianapolis, Ind., a corporation of Indiana
No Drawing. Filed Nov. 21, 1963, Ser. No. 325,448
5 Claims. (Cl. 260—285.5)

The present invention relates to novel octahydroindoloquinolines. More particularly this invention relates to 7 - methyl - 9-(pyrazole-1-carboxamido)-4,6,6a,7,8,9,10,10a-octahydroindolo[4,3-fg]quinolines.

The novel compositions of this invention have the following structural formula, wherein the numbering of the indoloquinoline ring system is indicated:

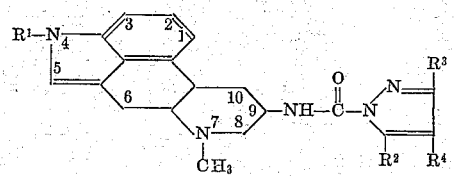

In the above formula, $R^1$ is hydrogen, methyl, ethyl, isopropyl, allyl, or propargyl; $R^2$ and $R^3$ are hydrogen, methyl, ethyl, propyl, isopropyl, phenyl, or halophenyl, such as for example, chlorophenyl, bromophenyl, iodophenyl, and the like; $R^4$ is hydrogen, an aliphatic radical containing from 1 to 3 carbon atoms, such as methyl, ethyl, allyl, propargyl, and the like, benzyl, halobenzyl, and halo such as fluoro, chloro, bromo, iodo, and the like; and $R^3$ and $R^4$, when taken together represent an alkylene chain of 3 to 4 carbon atoms which, together with the carbon atoms to which they are attached, form a cycloaliphatic ring such as cyclopentyl or cyclohexyl.

The compounds of the present invention are readily prepared by known methods from dihydrolysergic acid, the preparation of which is known in the literature. Thus, for example, the preparation of the above compounds wherein $R^1$ is hydrogen can begin with the esterification of the said dihydrolysergic acid with diazomethane by known methods to yield the methyl ester of dihydrolysergic acid. The reaction of this ester with hydrazine results in its cleavage and the formation of the hydrazide of dihydrolysergic acid. This hydrazide can be converted by means of the well-known Curtius reaction by treatment with nitrous acid to the corresponding azide and thence to the isocyanate which, in turn, can be converted to the desired pyrazole-1-carboxamide.

Where $R^1$ is a group other than hydrogen, alkylation with the appropriate halide is first effected. Exemplary of the halides which can be employed in the alkylation procedure are methyl iodide, ethyl bromide, ethyl iodide, isopropyl bromide, allyl chloride, allyl bromide, propargyl chloride and the like. The alkylation can be carried out upon dihydrolysergic acid itself, or upon its methyl ester or hydrazide.

The desired substitution at $R^2$, $R^3$, and $R^4$ is obtained by employing the appropriately substituted pyrazole in the step leading to the formation of the pyrazole carboxamide. The desired pyrazoles, in turn, are obtained from suitable β-dicarbonyl compounds by reaction with hydrazine according to well-known methods. The 4-halopyrazoles are likewise prepared by methods known in the art.

Among the many pyrazoles which can be successfully employed for the preparation of the compounds of this invention are pyrazole,
3,5-dimethylpyrazole,
3,5-diethylpyrazole,
3,5-di-n-propylpyrazole,
3,5-diisopropylpyrazole,
3,-methyl-5-ethylpyrazole,
3-methyl-5-phenylpyrazole,
3-ethyl-5-phenylpyrazole,
3-methyl-5-o-chlorophenylpyrazole,
3-methyl-5-p-bromophenylpyrazole,
3-ethyl-5-p-chlorophenylpyrazole,
3,5-dimethyl-4-bromopyrazole,
3,5-diethyl-4-bromopyrazole,
3,5-dimethyl-4-chloropyrazole,
3,5-dimethyl-4-benzylpyrazole,
3,5-diethyl-4-benzylpyrazole,
3,5-dimethyl-4-p-chlorobenzylpyrazole,
3,4,5-trimethylpyrazole,
3,4-dimethyl-5-ethylpyrazole,
3-methyl-5-propyl-4-bromopyrazole,
4,5-trimethylenepyrazole,
4,5-tetramethylenepyrazole, and the like.

Since amide formation presumably can occur at either N atom of the pyrazole ring, two different products can result when an unsymmetrically substituted pyrazole is employed in the final step of the synthesis, depending upon whether the N atom entering into amide formation is at the 1 or 2 position. In such cases, it has not been determined at which N atom the reaction occurs, and, in fact, it is highly probable that a mixture containing both possible products results. In accordance with established practice, the position of the substituents in such cases has been indicated in the alternative. Thus, for example, the product resulting from dihydrolysergic acid azide and 3-methyl-5-ethylpyrazole is denominated herein as 7-methyl - 9 - [3(5)-methyl-5(3)-ethylpyrazole-1-carboxamido] - 4,6,6a,7,8,9,10,10a - octahydroindolo[4,3 - fg] quinoline.

The conversion of the hydrazides to the desired pyrazole carboxamides can be carried out without the necessity of isolating the intermediate azides and isocyanates. Alternatively, if desired, these intermediates can be isolated and purified before proceeding with the synthesis. Other possible modifications in the synthetic scheme will be apparent to those skilled in the art.

The compounds of the present invention have interesting and valuable physiological properties. To a greater or lesser degree, the compounds exhibit hypotensive activity in normotensive or hypertensive dogs. In addition, many of the compounds exhibit antiulcer activity in rats against ulcers induced by serotonin, prednisolone, or histamine. Significantly, the antiulcer activity is accompanied by little or no antisecretory activity. In general, the compounds wherein $R^1$ is hydrogen exhibit superior hypotensive properties and are preferred for this purpose. Especially preferred among these compounds is 7-methyl-9-(3,5-dimethylpyrazole-1-carboxamido) - 4,6,6a,7,8,9,10,10a - octahydroindolo[4,3 - fg]quinoline. Among the compounds showing a high degree of antiulcer activity are 4,7-dimethyl-9-(3,5-dimethylpyrazole-1-carboxamido) - 4,6,6a,7,8,9, 10,10a-octahydroindolo[4,3-fg]quinoline and 4 - ethyl - 7- methyl-9-(3,5-dimethylpyrazole-1 - carboxamido) - 4,6,6a,7,8,9,10,10a-octahydroindolo[4,3-fg]quinoline.

The acid addition salts of the described compounds with organic and inorganic acids are likewise a part of the present invention. These can be prepared by methods well-known in the art and include salts with hydrochloric, hydrobromic, sulfuric, phosphoric, acetic, propionic, maleic, fumaric, benzoic, p-toluenesulfonic, salicylic, mandelic, cinnamic, naphthoic, ascorbic, succinic, citric, tartaric, malic, pamoic, and like acids. In general, the salts with organic acids are more readily obtained in crystalline form and are, therefore, preferred.

The practice of the invention can be more readily understood in the light of the preparations and examples which follow. It is to be understood that these are illustrative only and are not intended to limit the scope of the invention thereto.

PREPARATION OF 4-METHYLDIHYDROLYSERGIC ACID

Sodium amide is prepared in the usual manner from 1.2 g. of sodium in 200 ml. of liquid ammonia. When the formation of sodium amide is complete, 5.4 g. of dihydrolysergic acid are added portionwise with stirring. Stirring is continued for 30 additional minutes, and 3 ml. of methyl iodide are then added dropwise during about 10 minutes. The reaction mixture is stirred under refluxing conditions for another half-hour, the ammonia is permitted to evaporate, and 150 ml. of water are added cautiously. The aqueous mixture is stirred vigorously for about a half-hour, then filtered, and the filtrate is evaporated in vacuo. About 50 ml. of methanol are added to the residue and the mixture is stirred well and filtered. The filtrate is boiled for about 5 minutes with decolorizing carbon and is then filtered through a filter aid to remove the carbon. The resulting clear methanolic solution is treated dropwise with acetic acid until it is only very weakly basic. The partially neutralized solution is refrigerated to precipitate a slightly colored material comprising 4-methyldihydrolysergic acid. The structure is confirmed by physicochemical methods. Thin layer chromatography establishes that only one substance is present.

By employing the above-described procedure with the appropriate halide, the following 4-substituted dihydrolysergic acids are obtained:

4-ethyldihydrolysergic acid
4-n-propyldihydrolysergic acid
4-isopropyldihydrolysergic acid
4-allyldihydrolysergic acid
4-propargyldihydrolysergic acid

PREPARATION OF THE METHYL ESTERS OF THE DIHYDROLYSERGIC ACIDS

A mixture of 7 g. of dihydrolysergic acid in 50 ml. of methanol is treated with an excess of diazomethane in benzene. (The diazomethane is generated from 20 g. of nitrosomethylurea and is collected in 400 ml. of benzene.) The reaction mixture is allowed to stand at room temperature overnight and is then filtered. The filtrate is evaporated to dryness in vacuo, and the light tan solid residue is dissolved in about 225 ml. of methanol. The methanolic solution is boiled with decolorizing carbon and filtered. Water is added to the clear filtrate to incipient turbidity and the mixture is refrigerated to precipitate 3.17 g. of buff-colored needles of methyl dihydrolysergate melting at about 185° C.

By following the above procedure or a conventional modification thereof with the appropriate 4-substituted dihydrolysergic acid, the following methyl esters are obtained:

Methyl 4-methyldihydrolysergate, from 4-methyldihydrolysergic acid; M.P. about 117–119° C. after recrystallization from methylcyclohexane.

Methyl 4-ethyldihydrolysergate, from 4-ethyldihydrolysergic acid; M.P. about 117–118° C. after recrystallization from methylcyclohexane.

Methyl 4-n-propyldihydrolysergate, from 4-n-propyldihydrolysergic acid; M.P. about 80° C. after recrystallization from aqueous methanol.

Methyl 4-isopropyldihydrolysergate, from 4-isopropyldihydrolysergic acid; M.P. about 110–114° C. after recrystallization from aqueous methanol.

Methyl 4-allyldihydrolysergate, from 4 - allyldihydrolysergic acid; M.P. about 103–104° C. after recrystallization from methylcyclohexane.

Methyl 4-propargyldihydrolysergate, from 4-propargyldihydrolysergic acid.

PREPARATION OF DIHYDROLYSERGIC ACID HYDRAZIDES

A mixture of 1.1 g. of methyl dihydrolysergate and 10 ml. of anhydrous hydrazine is heated under reflux for one and a half hours. The reaction mixture is diluted with 5.7 ml. of water and is then refrigerated. The fine, nearly white needles which crystallize from the mixture are collected by filtration, washed with hydrazine hydrate and then with methanol, and then air dried. The dihydrolysergic acid hydrazide so obtained melts with decomposition at about 242–245° C.

When the above-described procedure is employed with the 4-substituted dihydrolysergic acid methyl esters, the corresponding 4-substituted dihydrolysergic acid hydrazides are obtained. The following hydrazides are obtained in this fashion:

4-methyldihydrolysergic acid hydrazide, M.P. (dec.) about 240–255° C.

4-ethyldihydrolysergic acid hydrazide, M.P. about 175–177° C.

4-n-propyldihydrolysergic acid hydrazide, M.P. (dec.) about 174–178° C.

4-isopropyldihydrolysergic acid hydrazide, M.P. (dec.) about 210–215° C.

4-allyldihydrolysergic acid hydrazide, M.P. (dec.) about 225° C.

4-propargyldihydrolysergic acid hydrazide.

PREPARATION OF PYRAZOLES

The pyrazoles employed as intermediates in the preparation of the compounds of this invention are prepared by the well-known reaction of β-dicarbonyl compounds with hydrazine. Illustrative of this method is the following described procedure for the preparation of 3-methyl-4,5-trimethylenepyrazole.

A mixture of 12.6 g. of 2-acetylcyclopentanone, 13.3 g. of hydrazine sulfate, 50 ml. of methanol, and 150 ml. of water is heated on a steam bath for about one hour. The resulting clear yellow solution is filtered and treated with excess sodium bicarbonate. The granular, colorless solid which separates is collected by filtration, washed with water and air dried to give a product melting at about 143–145° C. Recrystallization of this crude product from boiling iso-octane gives 3-methyl-4,5-trimethylenepyrazole melting at about 144–145° C.

The same procedure, carried out with 2-acetylcyclohexanone yields 3 - methyl - 4,5 - tetramethylenepyrazole boiling at about 145° C. at about 10 mm. Hg. Final purification of this intermediate is effected by recrystallization of its maleate salt which melts at about 111–111.5° C.

*Example 1*

To 200 ml. of 0.1 N HCl cooled to about 0 to 5° C., 2.84 g. of dihydrolysergic acid hydrazide are added and the mixture is stirred until the hydrazide has gone into solution. To the solution are added dropwise 100 ml. of a 0.1 N aqueous solution of sodium nitrite during about 10 to 15 minutes. An additional 130 ml. of 0.1 N HCl are then added dropwise. The reaction mixture is stirred at about 0 to 5° C. for about 45 minutes and is then treated with excess sodium bicarbonate. The neutralized mixture is extracted with five 400-ml. portions of ether. The combined extracts are dried over anhydrous magnesium sulfate and filtered to remove the drying agent, and the filtrate is evaporated in vacuo. The solid residue, comprising dihydrolysergic acid azide, is dissolved in about 1800 ml. of anhydrous benzene and the benzene solution is boiled on the steam bath for about 30 minutes to bring about the rearrangement of the azide to the isocyanate. At the end of this time, 0.7 g. of pyrazole is added and the resulting yellow solution is again boiled for about a half hour. The reaction mixture is allowed to remain at room temperature overnight and the light yellow needles which crystallize are collected by filtration and dried. The 7-methyl-9-(pyrazole-1-carboxamido)-4,6,6a,7,8,9,10,10a-octahydroindolo-[4,3-fg]quinoline so obtained melts with decomposition at about 198–220° C.

The free base obtained as described in the above procedure is dissolved in about 30 ml. of boiling methanol with excess maleic acid. The mixture is filtered and the filtrate is diluted with ether and refrigerated to bring about the crystallization of the maleate salt, which decomposes at a temperature above 190° C.

Example 2

The procedure of Example 1 is followed for the preparation of the dihydrolysergic acid azide. The benzene solution of the azide is heated as described above and is then treated with 1 g. of 3,5-dimethylpyrazole. The 7-methyl-9-(3,5-dimethylpyrazole-1-carboxamido)-4,6,6a,7,8,9,10,10a-octahydroindolo[4,3-fg]quinoline so obtained melts with decomposition above 225° C.

Example 3

By employing the procedure of Example 1 and substituting 1.5 g. of 3,5-diethylpyrazole therein, 7-methyl-9-(3,5-diethylpyrazole-1 - carboxamido) - 4,6,6a,7,8,9,10,10a-octahydroindolo[4,3-fg]quinoline is obtained. Recrystallization from acetonitrile yields a product melting with decomposition at about 235–240° C.

The maleate salt, prepared as described in Example 1, melts at about 195–215° C.

Example 4

When 2 g. of 3,5-di-n-propylpyrazole are employed in the procedure of Example 1, 7-methyl-9-(3,5-di-n-propylpyrazole-1-carboxamido)-4,6,6a,7,8,9,10,10a - octahydroindolo[4,3-fg]quinoline is obtained. Recrystallization from acetonitrile yields nearly colorless minute plates decomposing at about 215–225° C.

Example 5

A benzene solution of the isocyanate derived from dihydrolysergic acid is prepared by the procedure employed in Example 1. The solution is heated for about a half hour with 1.5 g. of 3-methyl-4,5-trimethylenepyrazole and is then allowed to remain at room temperature overnight. The residual yellow solid remaining after removal of the solvent in vacuo is relatively insoluble in the usual organic solvents. This solid is dissolved in dimethylformamide with excess maleic acid, diluted with ether, and refrigerated. The fine needles which crystallize are collected by filtration, washed with methanol, and dried to yield the maleate of 7-methyl-9-[3(5)-methyl-4,5(3,4)-trimethylenepyrazole-1-carboxamido] - 4,6,6a,7,8,9,10,10a-octahydroindolo[4,3-fg]quinoline, melting with decomposition at about 205–220° C.

Example 6

By employing 3-methyl-4,5-tetramethylenepyrazole in the procedure of Example 5, 7-methyl-9-[3(5)-methyl-4,5(3,4) - tetramethylenepyrazole - 1-carboxamido]-4,6,6a,7,8,9,10,10a - octahydroindolo[4,3-fg]quinoline maleate, melting with decomposition at about 205–225° C., is obtained.

The 4 - substituted - 7 - methyl-9-(pyrazole-1-carboxamido) - 4,6,6a,7,8,9,10,10a-octahydroindolo[4,3-fg]quinolines are prepared from the appropriate 4-substituted dihydrolysergic acids by employing the above-described procedures or modifications thereof. The preparation of 4,7-dimethyl-9-(pyrazole-1-carboxamido)-4,6,6a,7,8,9,10,10a-octahydroindolo[4,3-fg]quinoline described below is illustrative.

Example 7

An ethereal solution of the azide of 4-methyldihydrolysergic acid is prepared by a procedure analogous to that described in Example 1. The ether is replaced with 1500 ml. of dry benzene, and conversion of the azide to the isocyanate is effected by boiling the benzene solution for about one-half hour. After 0.8 g. of pyrazole has been added, the reaction mixture is again boiled for about one hour and is then allowed to stand overnight at room temperature. Evaporation of the solvent in vacuo leaves a yellow solid which is recrystallized from acetonitrile to give light yellow needles of 4,7-dimethyl-9-(pyrazole-1-carboxamido) - 4,6,6a,7,8,9,10,10a - octahydroindolo[4,3-fg]quinoline, melting at about 182–190° C. with decomposition.

In an analogous manner, the compounds listed below are prepared from 4-methyldihydrolysergic acid hydrazide and the indicated pyrazole. In some instances the final product crystallizes directly from the reaction medium.

4,7 - dimethyl - 9 - (3,5 - dimethylpyrazole-1-carboxamido) - 4,6,6a,7,8,9,10,10a-octahydroindolo[4,3-fg]quinoline, M.P. (dec.) about 195–205° C., prepared with 3,5-dimethylpyrazole.

4,7 - dimethyl - 9 - (3,5-dimethyl-4-benzylpyrazole-1-carboxamido) - 4,6,6a,7,8,9,10,10a - octahydroindolo[4,3-fg]quinoline, M.P. (dec.) about 198–200° C., prepared with 3,5-dimethyl-4-benzylpyrazole.

4,7 - dimethyl - 9 - (3,5-dimethyl-4-bromopyrazole-1-carboxamido) - 4,6,6a,7,8,9,10,10a - octahydroindolo[4,3-fg]quinoline, M.P. (dec.) about 185–193° C., prepared with 3,5-dimethyl-4-bromopyrazole.

4,7 - dimethyl - 9 - [3(5)-methyl-5(3)-phenylpyrazole-1 - carboxamido] - 4,6,6a,7,8,9,10,10a - octahydroindolo[4,3-fg]quinoline, M.P. (dec.) about 181–183° C., prepared with 3-methyl-5-phenylpyrazole.

4,7 - dimethyl - 9 - (3,5 - diethylpyrazole - 1 - carboxamido) - 4,6,6a,7,8,9,10,10a - octahydroindolo[4,3 - fg]quinoline, M.P. about 134–138° C., prepared with 3,5-diethylpyrazole.

4,7-dimethyl - 9-(3,5 - di - n - propylpyrazole-1-carboxamido) - 4,6,6a,7,8,9,10,10a - octahydroindolo[4,3 - fg]quinoline, M.P. about 138–140° C., prepared with 3,5-di-n-propylpyrazole.

4,7 - dimethyl - 9 - (3,5-diisopropylpyrazole-1-carboxamido) - 4,6,6a,7,8,9,10,10a - octahydroindolo[4,3 - fg]quinoline, M.P. (dec.) about 155–157° C., prepared with 3,5-diisopropylpyrazole.

Example 8

When the azide prepared from 4-ethyldihydrolysergic acid is employed in the procedure of Example 7 with the appropriate pyrazole the following compounds are obtained:

4 - ethyl - 7 - methyl-9-(3,5-dimethylpyrazole-1-carboxamido) - 4,6,6a,7,8,9,10,10a - octahydroindolo[4,3 - fg]quinoline, M.P. (dec.) about 187–192° C., prepared with 3,5-dimethylpyrazole.

4 - ethyl - 7 - methyl-9-(3,5-diethylpyrazole-1-carboxamido) - 4,6,6a,7,8,9,10,10a - octahydroindolo[4,3 - fg]quinoline, M.P. (dec.) about 155–157° C., prepared with 3,5-diethylpyrazole.

4 - ethyl - 7 - methyl-9-(3,5-dimethyl-4-bromopyrazole-1-carboxamido) - 4,6,6a,7,8,9,10,10a - octahydroindolo[4,3-fg]quinoline, M.P. (dec.) about 190–200° C., prepared with 3,5-dimethyl-4-bromopyrazole.

4 - ethyl - 7 - methyl-9-(3,5-diethyl-4-bromopyrazole-1-carboxamido) - 4,6,6a,7,8,9,10,10a - octahydroindolo[4,3- fg]quinoline, M.P. (dec.) about 132–134° C. after recrystallization from acetonitrile; prepared with 3,5-diethyl-4-bromopyrazole.

*Example 9*

The use of 4-n-propyldihydrolysergic acid azide and 3,5-dimethylpyrazole in the procedure of Example 7 yields 4 - n - propyl-7-methyl-9-(3,5-dimethylpyrazole-1-carboxamido) - 4,6,6a,7,8,9,10,10a - octahydroindolo[4,3 - fg]quinoline, melting at about 167–173° C. after recrystallization from acetonitrile.

*Example 10*

The following compounds result when 4-isopropyldihydrolysergic acid azide and the appropriate pyrazole are employed in the procedure of Example 7:

4 - isopropyl - 7 - methyl - 9 - (3,5 - dimethylpyrazole-1-carboxamido) - 4,6,6a,7,8,9,10,10a - octahydroindolo[4,3-fg]quinoline, M.P. (dec.) about 180–190° C., prepared with 3,5-dimethylpyrazole.

4 - isopropyl - 7 - methyl - 9 - (3,5 - diisopropylpyrazole-1 - carboxamido) - 4,6,6a,7,8,9,10,10a - octahydroindolo-[4,3-fg]quinoline, M.P. about 185–190° C., prepared with 3,5-diisopropylpyrazole.

4 - isopropyl - 7 - methyl - 9 - (3,5 - dimethyl - 4 - bromopyrazole - 1 - carboxamido) - 4,6,6a,7,8,9,10,10a-octahydroindolo[4,3-fg]quinoline, M.P. about 188–190° C., prepared with 3,5-dimethyl-4-bromopyrazole.

4 - isopropyl - 7 - methyl - 9 - [3(5) - methyl - 5(3)- (p - chlorophenyl)pyrazole - 1 - carboxamido] - 4,6,6a, 7,8,9,10,10a-octahydroindolo[4,3-fg]quinoline, prepared with 3-methyl-5-(p-chlorophenyl)pyrazole.

4 - isopropyl - 7 - methyl - 9 - (3,5 - dimethyl - 4 - chloropyrazole - 1 - carboxamido) - 4,6,6a,7,8,9,10,10a - octahydroindolo[4,3-fg]quinoline, prepared with 3,5-dimethyl-4-chloropyrazole.

4 - isopropyl - 7 - methyl - 9 - [3,5 - dimethyl - 4 - (p-chlorobenzyl)pyrazole - 1 - carboxamido] - 4,6,6a,7,8,9, 10,10a-octahydroindolo[4,3-fg]quinoline, prepared with 3,5-dimethyl-4-(p-chlorobenzyl)pyrazole.

*Example 11*

When 4-allyldihydrolysergic acid azide is employed with 3,5-dimethylpyrazole in the procedure of Example 7, 4-allyl - 7 - methyl - 9 - (3,5 - dimethylpyrazole - 1 - carboxamido) - 4,6,6a,7,8,9,10,10a - octahydroindolo[4,3-fg]-quinoline is obtained. The product, after recrystallization from acetonitrile melts at about 155–160° C.

*Example 12*

The preparation of 4-propargyl-7-methyl-9-(3,5-dimethylpyrazole - 1 - carboxamido) - 4,6,6a,7,8,9,10,10a-octahydroindolo[4,3-fg]quinoline is accomplished from 4-propargyldihydrolysergic acid azide and 3,5-dimethylpyrazole.

We claim:

1. A member selected from the group consisting of compounds of the formula

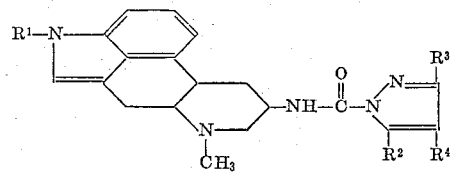

and the salts thereof with pharmaceutically acceptable acids, wherein $R^1$ is selected from the group consisting of hydrogen, methyl, ethyl, isopropyl, allyl, and propargyl; $R^2$ and $R^3$ are selected from the group consisting of hydrogen, methyl, ethyl, propyl, isopropyl, phenyl, and halophenyl; $R^4$ is selected from the group consisting of hydrogen, $C_1$–$C_3$ aliphatic radicals, benzyl, halobenzyl, and halo; and $R^3$ and $R^4$, when taken together, comprise an alkylene chain of 3 to 4 carbon atoms which, together with the carbon atoms to which they are attached, form a cycloaliphatic ring selected from the group consisting of cyclopentyl and cyclohexyl.

2. 7 - methyl - 9 - (3,5 - dimethylpyrazole - 1 - carboxamido) - 4,6,6a,7,8,9,10,10a - octahydroindolo[4,3-fg]-quinoline.

3. 4,7 - dimethyl - 9 - (3,5 - dimethylpyrazole - 1-carboxamido) - 4,6,6a,7,8,9,10,10a - octahydroindolo[4,3-fg]quinoline.

4. 4 - ethyl - 7 - methyl - 9 - (3,5 - dimethylpyrazole-1-carboxamido) - 4,6,6a,7,8,9,10,10a - octahydroindolo[4,3-fg]quinoline.

5. 4 - isopropyl - 7 - methyl - 9 - (3,5 - dimethylpyrazole - 1 - carboxamido) - 4,6,6a,7,8,9,10,10a - octahydroindolo[4,3-fg]quinoline.

References Cited in the file of this patent

Zikan et al.: Coll. Czech. Chem. Comm., vol. 25, pp. 1922–8 (1960).

IRVING MARCUS, *Primary Examiner.*

NICHOLAS S. RIZZO, *Examiner.*